Patented June 10, 1952

2,599,867

UNITED STATES PATENT OFFICE 2,599,867

DESIZING AGENTS AND DESIZING BATHS

Eduard Schubert, Munchenstein, near Basel, Switzerland, assignor to Schweizerische Ferment A. G., Basel, Switzerland, a Swiss company No Drawing. Application December 6, 1949, Serial No. 131,494. In Switzerland June 11, 1949

9 Claims. (Cl. 195—2)

This invention is concerned with improvements in or relating to the manufacture of desizing agents.

Amylase alone is either not effective or only slightly effective as a desizing agent, dependent on its degree of purity; it is also very unstable, especially at elevated temperatures or when stored in a damp condition. Moreover, it is known that electrolytes particularly chlorides and certain calcium salts are effective as activating and stabilising agents for desizing agents; for this reason most enzymatic desizing agents contain common salt and frequently also calcium salts, generally in the form of calcium acetate or calcium formate. On addition of readily soluble calcium salts to desizing agents in such a quantity as to produce optimum efficiency in a desizing bath prepared from such agents, there is caused an adverse effect on the storage properties of such agents especially when stored in moist atmospheres.

It has now been found that the addition of calcium sulphate, for example in the form of gypsum, to solid desizing agents or to desizing baths, renders them as efficient as when soluble calcium salts are added and has the added advantage that the new products of the invention are considerably more stable, especially when stored in a moist atmosphere, than desizing agents containing soluble calcium salts.

Accordingly the invention comprises a desizing agent comprising amylase, common salt and calcium sulphate, for example in the form of gypsum.

According to a further feature of the invention there is provided a method of manufacturing a desizing agent which comprises mixing amylase, common salt and calcium sulphate for example in the form of gypsum.

According to a still further feature of the invention there is provided a method of manufacturing a pancreas preparation adapted for use as a desizing agent in which a mixture of pulped pancreatic glands, common salt and gypsum is dried and then ground and, if desired, defatted.

The invention also comprises desizing baths containing a desizing agent according to the invention.

In order that the invention may be well understood the following examples are given only as illustrations:

Example 1

300 gms. of a solid preparation of bacterial amylase are mixed with 200 gms. of calcium sulphate and about 500 gms. of common salt.

Example 2

Dried pancreatin powder, which has been freed from fat, is so mixed with calcium sulphate and common salt that the content of calcium sulphate is about 25% and that of the common salt at least 50%.

Example 3

Wet pulped pancreatic glands are mixed with a threefold quantity of fine gypsum (raw gypsum or calcined gypsum) and the resulting solid mass is dried in a current of air.

After drying the mass is finely ground and, if necessary, de-fatted with acetone. The resulting powder is thereupon mixed with such a quantity of common salt and gypsum that the gypsum content of the mixture finally amounts to about 25% and the common salt content about 50%.

What I claim is:

1. A desizing agent comprising an effective desizing amount of amylase, about 50% of common salt and about 20–25% of calcium sulphate.

2. A desizing agent comprising about 25% of amlyase, about 50% of common salt and about 25% of gypsum.

3. A desizing agent comprising an effective desizing amount of bacterial amylase, about 25% of calcium sulphate and about 50% of common salt.

4. A desizing agent comprising pancreatic glands, about 25% of calcium sulphate and about 50% of common salt.

5. A desizing bath comprising a desizing agent containing an effective desizing amount of amylase, about 50% of common salt and about 20–25% of calcium sulphate.

6. A desizing bath comprising a desizing agent containing an effective desizing amount of amylase, about 50% of common salt and about 25% of gypsum.

7. A desizing bath comprising a desizing agent containing bacterial amylase, about 25% of calcium sulphate and about 50% of common salt.

8. A desizing bath comprising a desizing agent containing pancreatic glands, about 20–25% of calcium sulphate and about 50% of common salt.

9. A desizing bath comprising a desizing agent containing pancreatic glands, about 25% of gypsum and about 50% of common salt.

EDUARD SCHUBERT.

REFERENCES CITED

The following references are of record in the file of this patent:

UNITED STATES PATENTS

| Number | Name | Date |
| --- | --- | --- |
| 1,430,523 | Jenny et al. | Sept. 26, 1922 |
| 1,959,400 | Withey | May 22, 1934 |
| 2,029,350 | Wallerstein et al. | Feb. 4, 1936 |
| 2,051,507 | Wasmund | Aug. 18, 1936 |